United States Patent [19]

Farmer et al.

[11] Patent Number: 5,478,981
[45] Date of Patent: Dec. 26, 1995

[54] RESISTIVE ELECTRODE

[75] Inventors: John E. Farmer; Carl A. Rotenberger, both of St. Petersburg, Fla.

[73] Assignee: Farmer Mold & Machine Works, Inc., St. Petersburg, Fla.

[21] Appl. No.: 358,363

[22] Filed: Dec. 19, 1994

[51] Int. Cl.[6] .................................................. B23K 11/30
[52] U.S. Cl. ...................... 219/86.1; 219/86.31; 219/120
[58] Field of Search ............................... 219/86.1, 86.25, 219/86.37, 86.8, 86.9, 119, 120

[56] References Cited

U.S. PATENT DOCUMENTS

| 2,200,887 | 5/1940 | Lockwood | 219/119 |
| 2,271,119 | 1/1942 | Cox et al. | 219/120 |
| 3,908,741 | 9/1975 | Keizer | 164/80 |

Primary Examiner—Teresa J. Walberg
Assistant Examiner—J. Pelham
Attorney, Agent, or Firm—Frijouf, Rust & Pyle

[57] ABSTRACT

An improved resistive electrode is disclosed for a welding apparatus for welding a battery terminal post to a battery bushing, The battery terminal post is electrically connected to a battery plate disposed within a battery case and the battery bushing is secured to a battery case cover with the bushing having a central bushing aperture for receiving the battery terminal post therein when the battery case cover is located on the battery case. The resistive electrode comprising a resistive electrode extending between a base end and a tip end with the base end being secured to a power source. A conductive member engages the resistive electrode for facilitating the flow of electric power from the base end to the tip end for concentrating the resistive heat proximate to the tip end of the resistive electrode.

19 Claims, 11 Drawing Sheets

PRIOR ART

PRIOR ART

PRIOR ART

PRIOR ART

RESISTIVE ELECTRODE

BACKGROUND OF THE INVENTION

1. Field of the Invention

This invention relates to the construction of electrical storage batteries relating to a welding apparatus for welding a battery terminal post to a battery bushing. More specifically, this invention relates to an improved resistive electrode for the welding apparatus having a superior heat distribution and a greater useful life.

2. Background of the Invention

The fabrication and assembly of an electric storage battery such as a lead acid storage battery have undergone major changes over the decades. The changes in the fabrication and assembly of an electric storage battery have been implemented to increase the reliability of the electric storage battery, to reduce the material cost of the electric storage battery and reduce the labor cost of associated with the assembly of the electric storage battery.

In some cases, many assembly process of the electric storage battery has been automated to reduce the overall cost of manufacture. One process in the assembly of the electric storage battery that has been automated is the process of electrically connecting a battery post to a battery bushing.

Typically, the battery case comprises a rectangular open top case having a plurality of intercell partition walls. A plurality of battery plates are respectively received between the plurality of intercell partition walls for forming a plurality of battery cell. The plurality of battery plates between the plurality of partition intercell walls are interconnected by intercell connectors extending through the intercell partition walls. The intercell connectors connect the plurality of battery plates between the plurality of partition intercell walls in an electrical series configuration.

A positive and negative battery post extends upwardly from the battery plates disposed in the battery cells at opposed ends of the battery case for providing a positive pole at one end of the battery case and a negative pole on the other end of the battery case. The positive and negative battery posts extend above the level of the battery case.

A battery case cover includes a positive and negative battery bushing secured to a top of the battery case cover. When the battery case cover is placed over the battery case, the positive and negative battery posts are received within the positive and negative bushings of the battery 4 case cover. The batter case cover is sealed to the battery case as should be well known to those skilled in the art.

The positive and negative battery post and the positive and negative battery bushings are made of a lead material in a lead acid battery. Various means have been devised in the past for electrically connecting the positive and negative battery posts to the positive and negative battery bushings secured to the battery case cover. One prior art method for electrically connecting the positive and negative battery posts to the positive and negative battery bushings is to utilize an open flame torch for melting the lead material to weld the positive and negative battery bushings to the positive and negative battery posts. Unfortunately, this prior art method provides inconsistent results and often produces electrical connections that appear to be satisfactory while being electrically defective. It should be appreciated by those skilled in the art that an improper or defect electrical connection between a battery post and a battery bushing is substantially detrimental to the overall performance of the electric storage battery.

In addition, the electrical connections of the positive and negative battery posts to the positive and negative battery bushings are essential to the safety of the electrical storage battery. If a battery post is not fused to the battery bushing, the electrical storage may leak acid and/or acid fumes from the battery bushing. There is also a hazard that the electric storage battery may explode causing damage to persona and/or property.

One novel method of electrically connecting the positive and negative battery posts to the positive and negative battery bushings utilizes an electrically conductive bushing mold and an electrically resistive electrode. The electrical conductive bushing mold was brought into engagement with the battery bushing and the resistive electrode was placed proximate the intersection of the battery bushing and the battery post. An electrical current was passed between the resistive electrode and the bushing mold for melting the battery bushing to provide the electrical connection between the battery post and the battery bushing. During the melting of the battery bushing, the resistive electrode was moved downwardly to ensure a substantial welding or bonding of the battery bushing and the battery post over desired vertical distance. The movement of the resistive electrode ensured that the battery bushing was properly electrically secured to the battery post.

Although the aforementioned prior art method provided electrical connections of superior reliability, this prior art process did have a major disadvantage. The major disadvantage of this prior art method was the requirement to frequently replace the resistive electrode. The need to frequently replacing the resistive electrode during the battery assembly process is a substantial disadvantage since the assembly process had to be halted in order to replace the resistive electrode in the welding process.

Therefore, it is an object of the present invention to provide an improved resistive electrode for welding a battery bushing to a battery post that overcomes the disadvantages of the prior art resistive electrodes and provides a substantial contribution to the battery assembly art.

Another object of this invention is to provide an improved resistive electrode for welding a battery bushing to a battery post with an increase useful life over the prior art resistive electrodes.

Another object of this invention is to provide an improved resistive electrode for welding a battery bushing to a battery post with a useful life of over six times the useful life of the resistive electrodes of the prior art.

Another object of this invention is to provide an improved resistive electrode for welding a battery bushing to a battery post incorporating a conductive sleeve for enhancing the flow of electrical current to a tip end of the resistive electrode for concentrating the resistive heat proximate to the tip end of the resistive electrode.

Another object of this invention is to provide an improved resistive electrode for welding a battery bushing to a battery post for facilitating the transfer of heat from the resistive electrode to a cooling fluid internal to the resistive electrode.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a welding apparatus for welding a battery terminal post to a battery bushing. The battery terminal post is electrically connected to a battery plate disposed within a battery case and the battery bushing being secured to a battery case cover. The bushing has a central bushing aperture for receiving the battery terminal post therein when the battery case cover is located on the battery case. The welding apparatus comprises a bushing mold for location on the battery bushing for connecting the bushing to a first connector of a power source. A resistive electrode is connected to a second connector of the power source. The resistive electrode is generally cylindrical and extends longitudinally between a base end and a tip end. The base end is secured to the second connector of the power source. A first bore is defined in the base end for receiving a cooling fluid for cooling the resistive electrode. A second bore is defined in the tip end for providing an annular tip surface for engaging with the battery bushing to enable the flow of electric power between the resistive electrode and the mold bushing to heat the resistive electrode for welding the battery terminal post to the battery bushing. The improvement of the resistive electrode comprises a conductive sleeve disposed in the first bore for enhancing the flow of electrical current from the base end to the tip end of the resistive electrode for concentrating the resistive heat proximate to the tip end of the resistive electrode. The conductive sleeve facilitates the transfer of heat from the resistive electrode to the cooling fluid.

In a more specific embodiment of the invention, the first bore defines a first bore sidewall and the conductive sleeve engages the first bore sidewall for facilitating the flow of heat therebetween. Preferably, the conductive sleeve having a sleeve thickness approximately forty percent of the thickness of the first sidewall thickness. The first bore extends into the resistive electrode a first bore distance approximately seventy percent of the longitudinal distance between the base end and the tip end of the resistive electrode. The first bore distance is at least four times greater than the second bore distance for concentrating the resistive heat in proximity to the tip end of the resistive electrode.

The conductive sleeve is formed from a sleeve material having an electrical conductivity substantially greater than the electrical conductivity the electrode material forming the resistive electrode. The conductive sleeve is formed from a sleeve material having a thermal conductivity substantially greater than the thermal conductivity the electrode material forming the resistive electrode.

Preferably, the tip end includes a radially outwardly extending region for defining an enlarged annular tip surface for engaging with the battery bushing to enable the flow of electric power between the resistive electrode and the mold bushing to heat the resistive electrode for welding the battery terminal post to the battery bushing.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
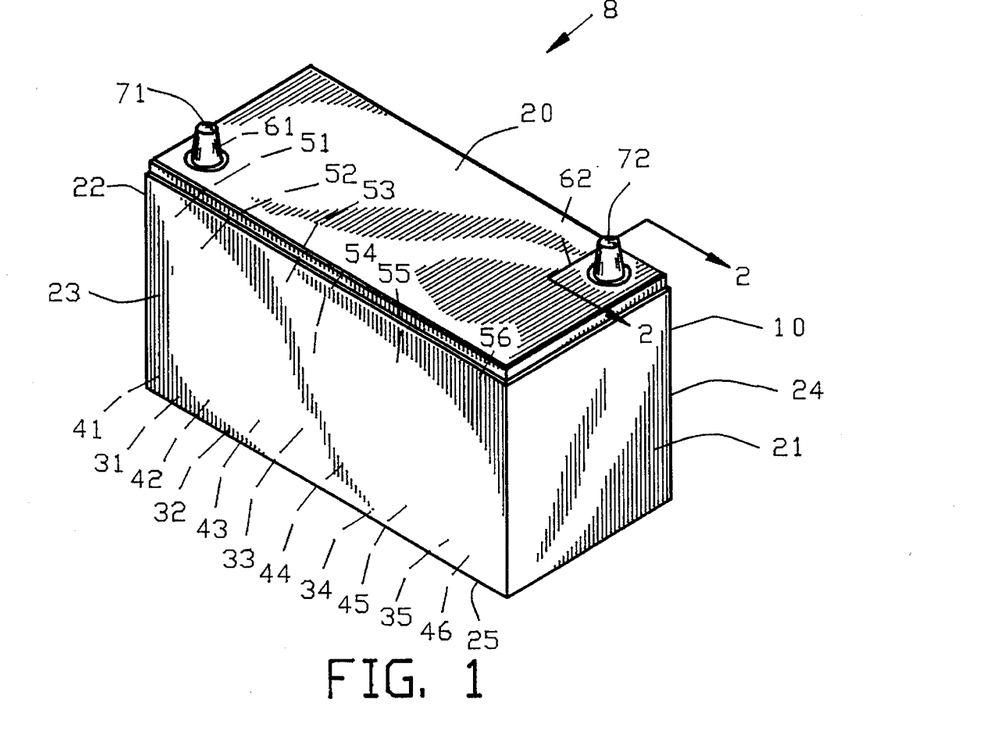
FIG. 1 is an isometric view of an electric storage battery.

FIG. 1 is an isometric view of electric storage battery 8 comprising a battery case 10 is in the shape of an open-topped box, comprising a first through fourth sidewall 11–14 and a bottom wall 15. A battery case cover 20 is secured to the battery case 10 for sealing the interior of battery case 10. Typically, the battery case 10 and the battery case cover 20 are fabricated from a polymeric material such as polyethylene or the like.

A plurality of intercell partitions 31, 32, 33, 34, and 35 are disposed in the battery casing 10 parallel to the first and second sides 21 and 22 of the battery case 10 for defining a plurality of battery cells 41–46. A plurality of battery plates 51–56 are disposed in the plurality of battery cells 41–46 and are connected by intercell connectors (not shown). The battery plates 51 and 56 are provided with terminal posts 61 and 62 for connection to battery bushings 71 and 72 located on the battery case cover 20 as will be described in greater detail hereinafter.

Figure 2:
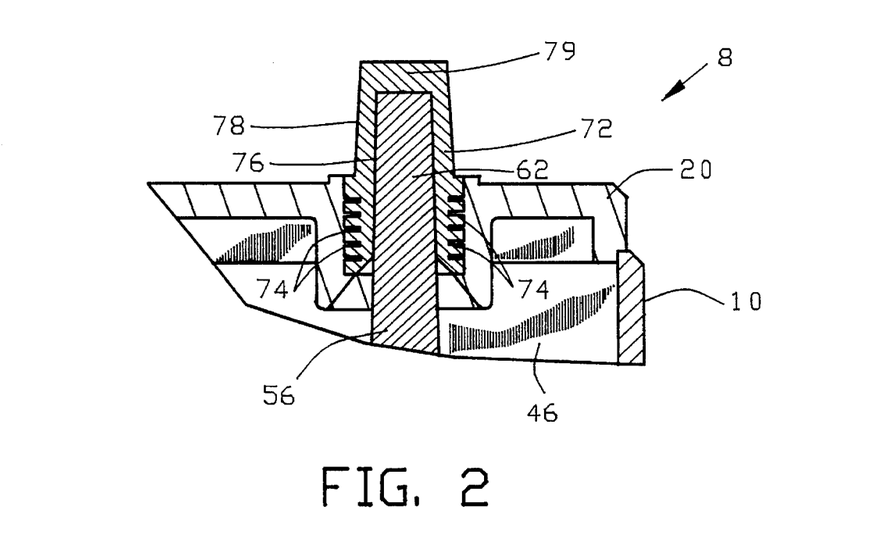
FIG. 2 is a partially sectional view along line 2—2 in FIG. 1 illustrating a battery terminal post and a battery terminal bushing.

FIG. 2 is a partially sectional view along line 2—2 in FIG. 1 illustrating the battery terminal post 62 and the battery bushing 72. A plurality of annular recesses 74 are defined in the battery bushing 72 for securing the battery bushing 72 to the battery case cover 20. Preferably, the battery case cover 20 is molded to extend into the plurality of annular recesses 74 of the battery bushing 72. The battery bushing 72 comprises a central aperture 76 for receiving the battery terminal post 62 therein and a tapered outer surface 78.

During the assembly of the electric storage battery 8, the plurality of battery plates 51–56 are positioned within the plurality of battery cells 41–46 and the plurality of battery plates 51–56 are interconnected by the intercell connectors (not shown). The terminal posts 61 and 62 of the battery plates 51 and 56 extend above the sidewalls 11–14. When the battery case cover 20 is secured to the battery case 10, the terminal posts 61 and 62 are received within apertures in the battery bushings 71 and 72 as shown by the battery terminal post 62 being received with central aperture 76 of the battery bushing 72 in FIG. 2. The battery terminal post 62 is welded to the battery bushing 72 by a weld 79 as shown in FIG. 2.

Figure 3:
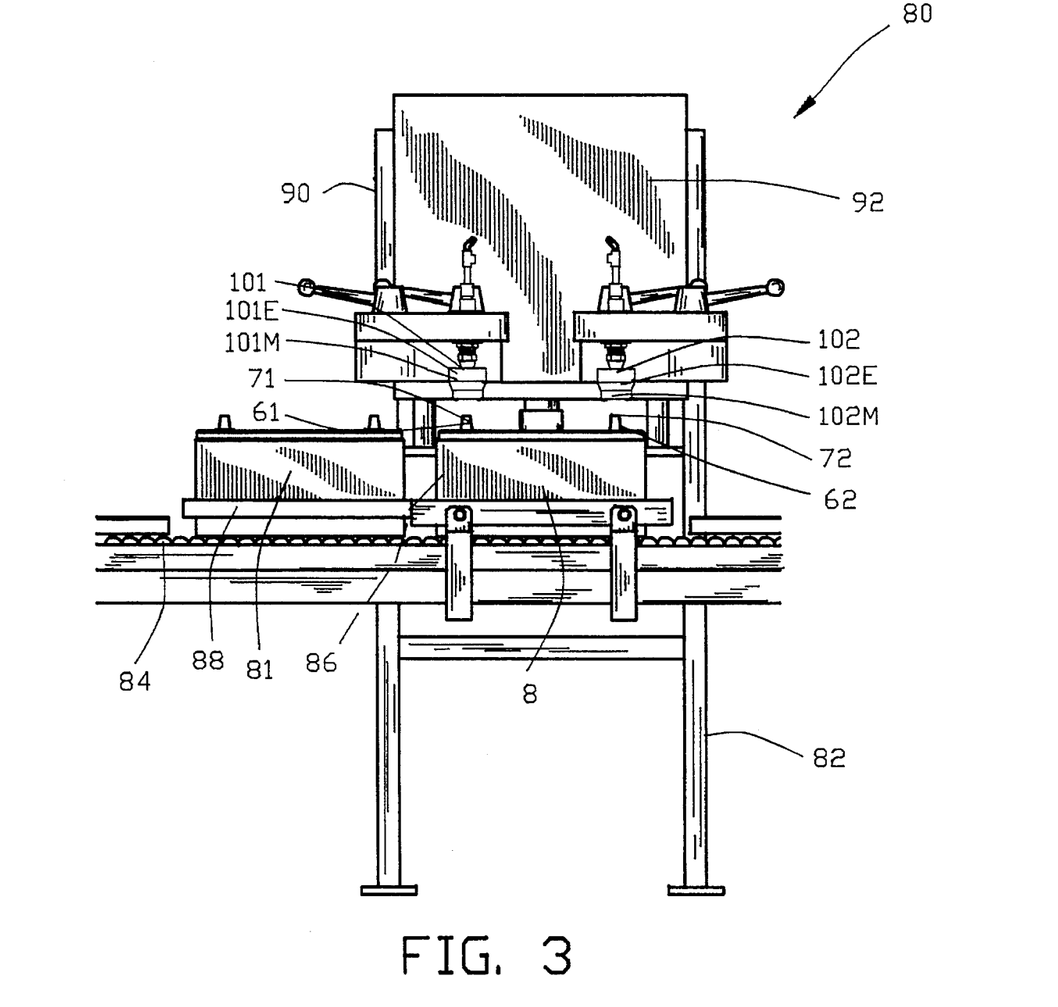
FIG. 3 is a front elevational view of a welding apparatus for welding the battery terminal post to the battery bushing with the welding apparatus shown in a raised position.
Figure 4:
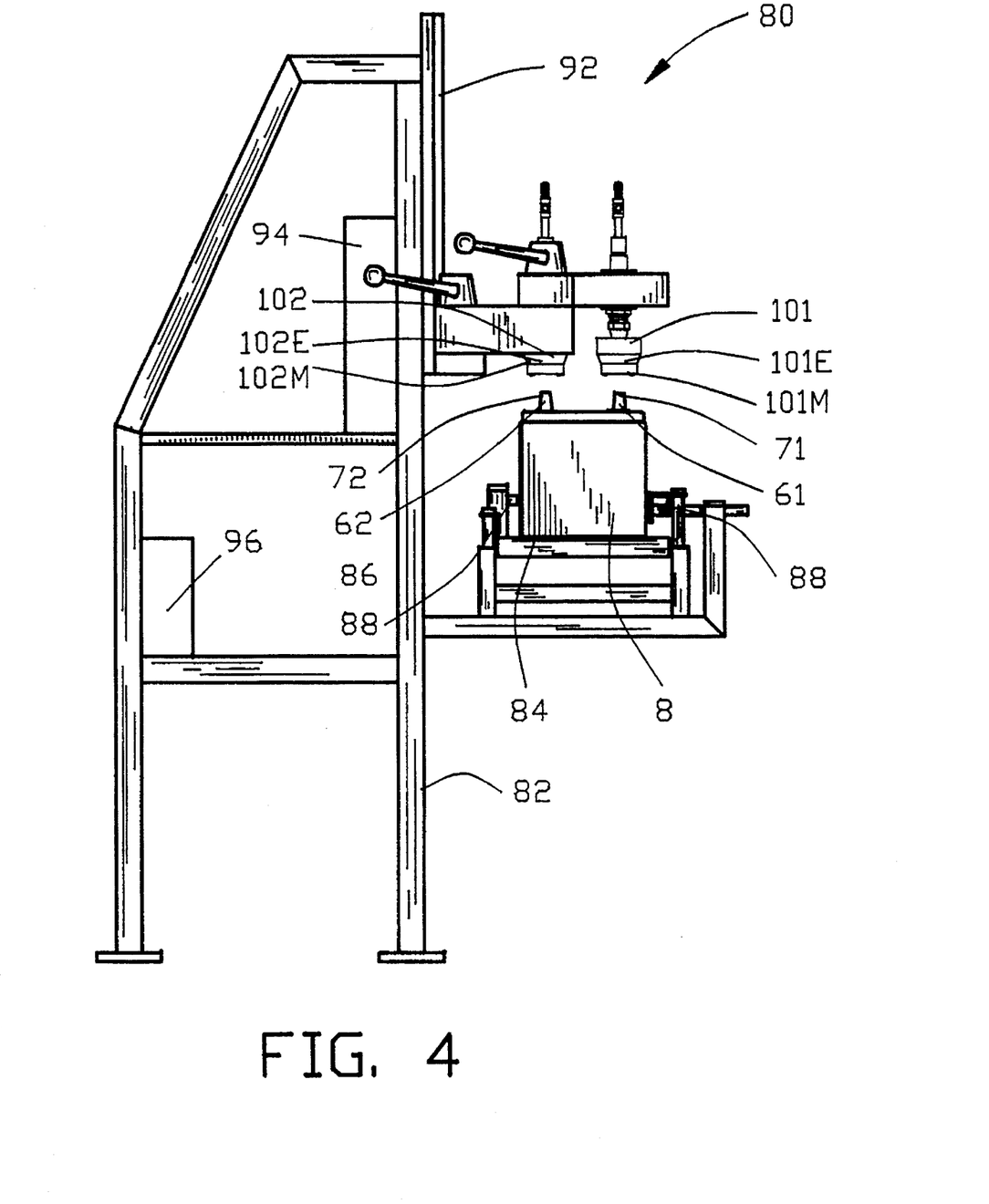
FIG. 4 is a side view of FIG. 3.

FIGS. 3 and 4 are front and side elevational views respectively of a welding apparatus 80 for welding the battery terminal posts 61 and 62 to the battery bushings 71 and 72. The apparatus 80 comprises a frame 82 supporting conveyor means shown as a conveyor belt 84 for transporting the storage battery 8 to a welding position 85, and for transporting the welded storage battery 8 from the welding position 85. The frame 82 supports a positioning means comprising a photosensor 86 and a side guide 88 for positioning the battery case 10 into the welding position 85.

An upstanding member 90 extends from frame 82 for supporting a movement actuator 92 by a moving means shown as a pneumatic cylinder 94. The pneumatic cylinder 94 moves the movement actuator 92 between a retracted position shown generally in FIGS. 3 and 4 and an extended position shown generally in FIGS. 5 and 6. A controller 96 interconnects the conveyor belt 84, the photosensor 86 and the pneumatic cylinder 94 for controlling the relative movements thereof.

A first and a second welder 101 and 102 is secured to the movement actuator 92 for movement between the retracted and the extended position. As will be described in greater detail hereinafter, each of the welders 101 and 102 comprises a resistive electrode 101E and 102E and a bushing mold 101M and 102M, respectively. The first and second welders 101 and 102 are connected to the controller 96 for controlling the welding operation in accordance with the operation of the welding apparatus 80.

The welding apparatus 80 of FIGS. 3–6 operates in the following manner. The conveyor belt 84 transports the storage battery case 8 toward the welding position 85, as shown in FIGS. 3 and 4. The photosensor 86 senses the arrival of the storage battery 8 on the conveyor belt 84 at the welding position 85 and signals the controller 96 to stop the conveyor belt 84 to position the storage battery 8 in the welding position 85 directly beneath the first and second welders 101 and 102.

Figure 5:
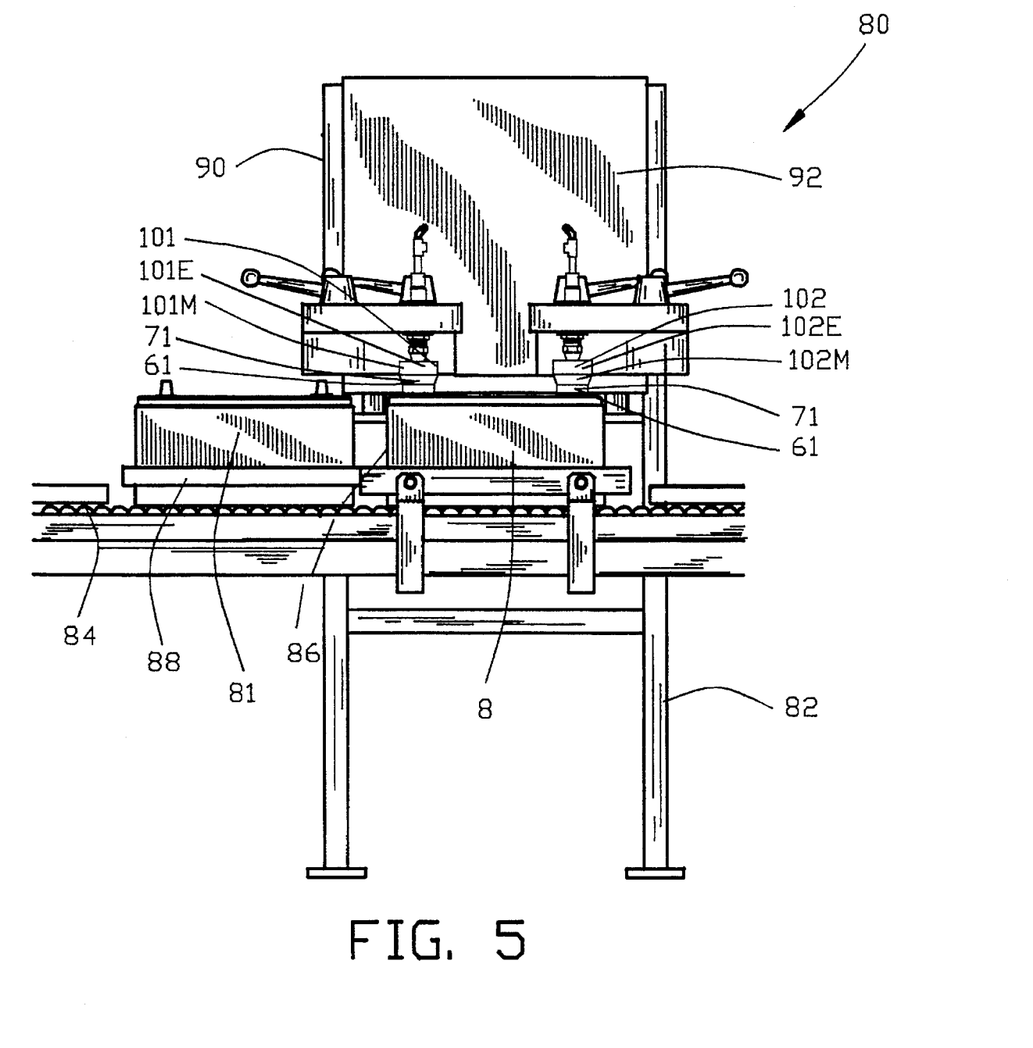
FIG. 5 is a front elevational view of a welding apparatus of FIG. 3 with the welding apparatus shown in a lowered position.
Figure 6:
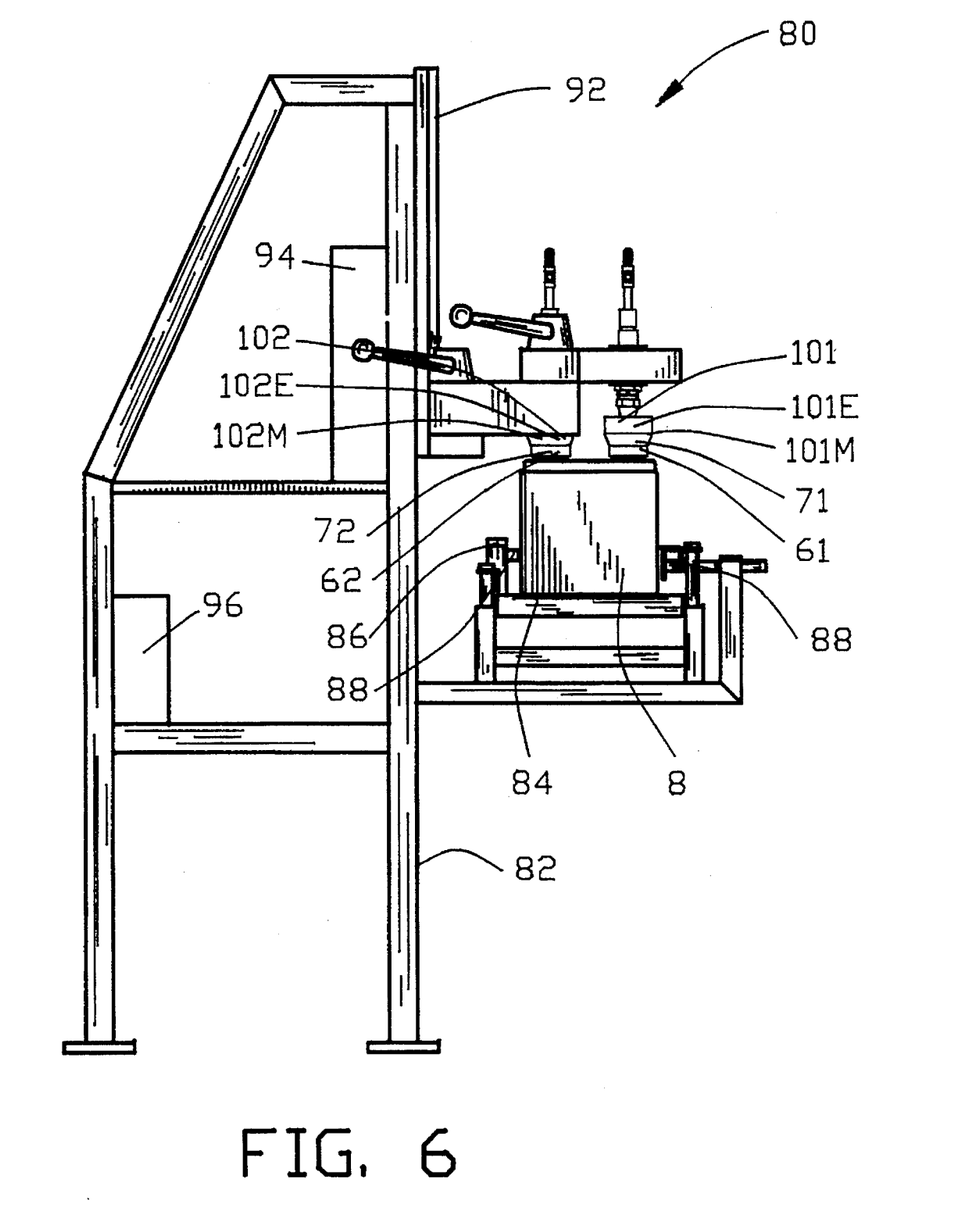
FIG. 6 is a side view of FIG. 5.

As shown in FIGS. 5 and 6, the pneumatic cylinder 82 moves the movement actuator 80 from the retracted position to the extended position whereat the first and second welders 101 and 102 make contact with the battery bushings 71 and 72. The controller 96 activates the first and second welders 101 and 102 to weld the terminal posts 61 and 62 to the battery bushings 71 and 72 as shown in FIG. 2.

After the battery terminal posts 61 and 62 have been welded to the battery bushings 71 and 72, the pneumatic cylinder 82 moves the movement actuator 80 from the extended position to the retracted position as shown in FIGS. 3 and 4. The controller 96 activates the conveyor belt 84 to transport the welded storage battery 8 from the welding position for further processing. Concomitantly therewith, the conveyor belt 84 transports a second storage battery 8' toward the welding position 85 for welding as previously described.

FIGS. 7–10 are sectional views of a portion of the welding apparatus 80 of FIGS. 3–6 illustrating the process of welding the battery bushing 72 to the battery post 62. The bushing mold 102M comprises a mold body 110 having a first and a second body end 111 and 112 with an aperture 114 extending therethrough. The aperture 114 has a first, second and a third shoulder 121–123 for respectively defining a first, second and third bore 131–133. A tapered bore 134 is disposed between the third bore 133 and the first body end 111 of the mold body 110. Preferably, the mold body 110 is integrally fabricated from a highly electrical conductive and thermal conductive material such as copper or the like.

Figure 7:
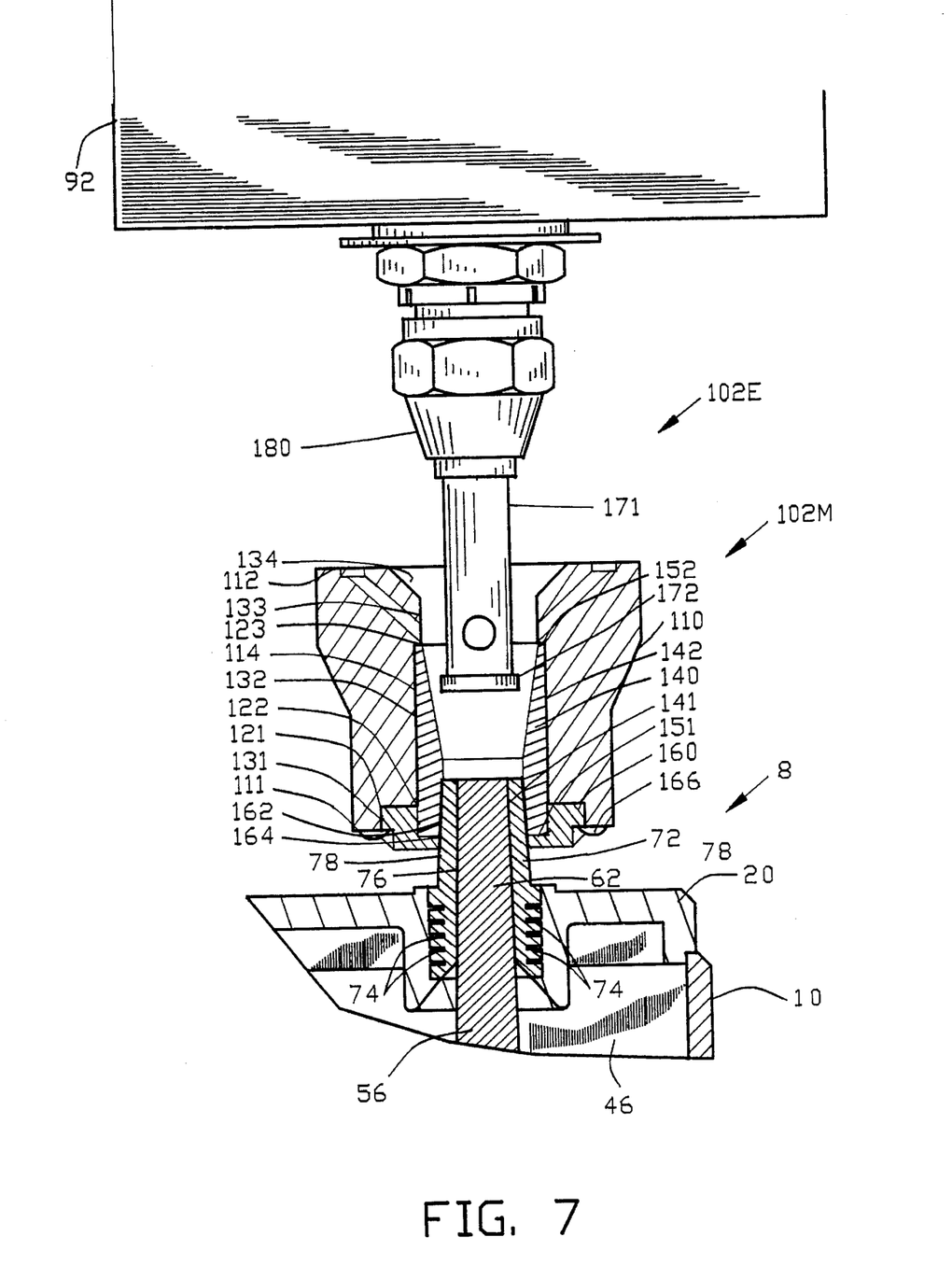
FIG. 7 is a sectional view of a portion of the welding apparatus of FIGS. 3–6 with the resistive electrode positioned above the battery bushing and battery post.

A mold insert 140 comprises a first and second tapered bore 141 and 142 and a cylindrical outer surface 144 extending between a first and a second insert end 151 and 152. The mold insert 140 is receivable within the mold body 110 with the cylindrical outer surface 144 engaging with the second bore 122 of the mold body 110 and with the first insert end 151 engaging with the third shoulder 133 of the mold body 110. Preferably, the mold insert 140 is integrally fabricated from an electrical insulating and thermal insulating material such as ceramic material or the like.

A mold cap 160 includes a tapered aperture 162 and a mold cap shoulder 164. The mold cap 160 is receivable within the first bore 131 with a plurality of screws 166 securing the mold cap 160 to the mold body 110. The mold cap shoulder 164 engages with the second insert end 152 for securing the mold insert 140 within the mold body 110. The tapered aperture 162 of the mold cap 160 cooperates with the first tapered bore 141 of the mold insert 140 for engaging with the tapered outer surface 78 of the battery bushing 72. Preferably, the mold cap 160 is integrally fabricated from a highly electrical conductive and thermal conductive material such as copper or the like.

The mold body 110 of the bushing mold 102M is connected to a first connector of a power source (not shown) for enabling the tapered aperture 162 of the mold cap 160 to make electrical contact with the tapered outer surface 78 of the battery bushing 72.

FIG. 7 illustrates the resistive electrode 102E positioned above the battery bushing 72 and battery post 62. The resistive electrode 102E is generally cylindrical and extends longitudinally between a base end 171 and a tip end 172. The base end 171 is secured by a coupler 180 for connecting the resistive electrode 102E to a second connector of the power source (not shown). As will be described in greater detail hereinafter, a coupler 180 supplies a cooling fluid 190 for cooling the resistive electrode 102E.

Figure 8:
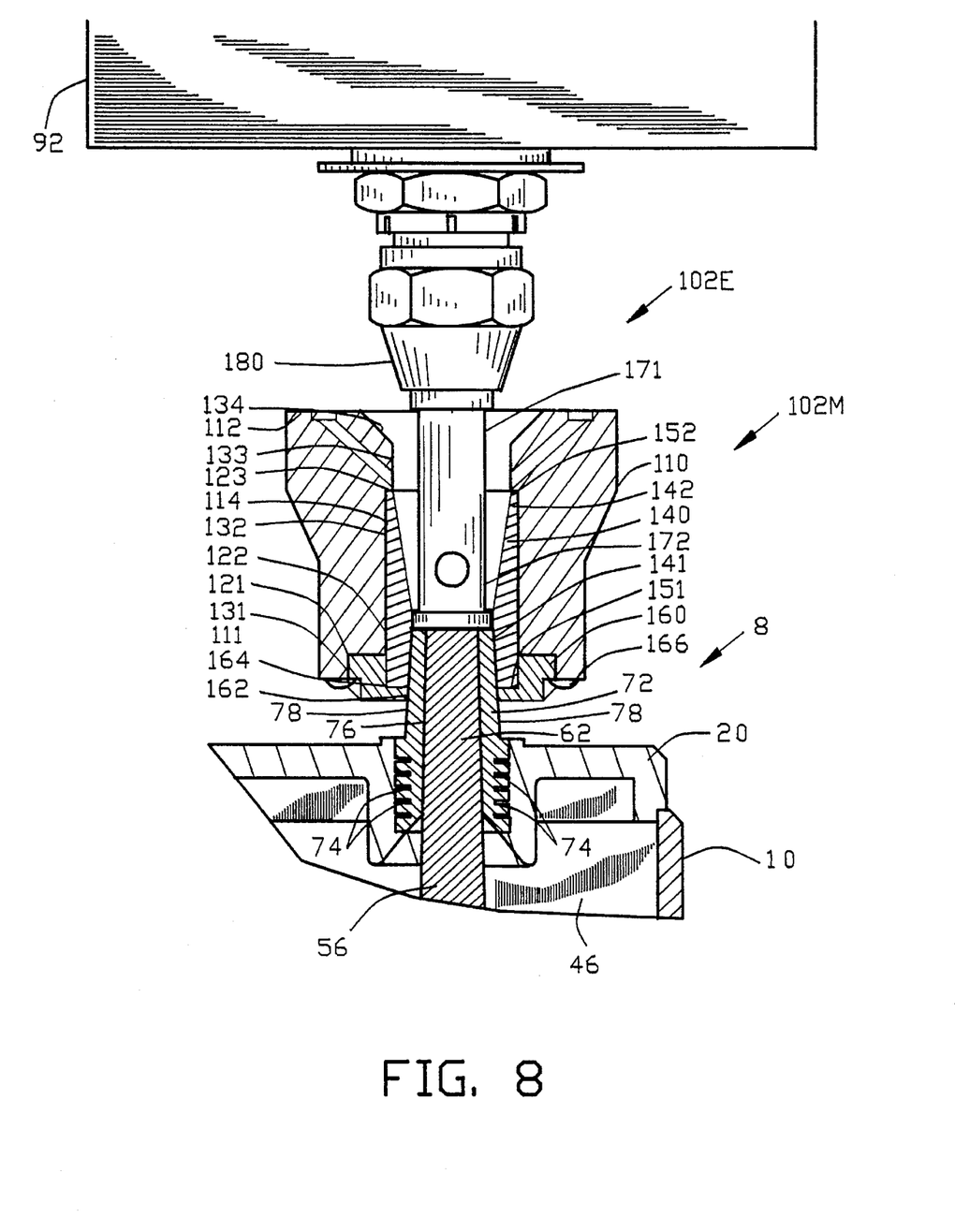
FIG. 8 is a sectional view similar to FIG. 7 with the resistive electrode contacting the battery bushing.

FIG. 8 is a sectional view similar to FIG. 7 with the resistive electrode 102E contacting the battery bushing 72. The resistive electrode 102E is move vertically downwardly for moving the tip end 172 into contact with the battery bushing 72. Preferably, the resistive electrode 102E is rotated relative to the battery bushing 72 for enabling the tip end 172 to remove any contaminants or oxides from the surface of the battery bushing 72.

After the contaminants or oxides are removed from the surface of the tip end 172, the controller 96 energizes the power source (not shown) for providing a flow of electric power between the resistive electrode 102E and the mold bushing 102M through the battery bushing 72 to heat the battery bushing 72. The electric power flows between the tip end 172 of the resistive electrode 102E and the tapered aperture 162 of the mold cap 160 secured the mold bushing 102M. The heating of the battery bushing 72 melts both the battery bushing 72 and the battery post 62. As the melting of the battery bushing 72 and the battery post 62 continues, the resistive electrode 102E is move vertically downwardly for melting a substantial upper portion of the battery bushing 72 and the battery post 62.

Figure 9:
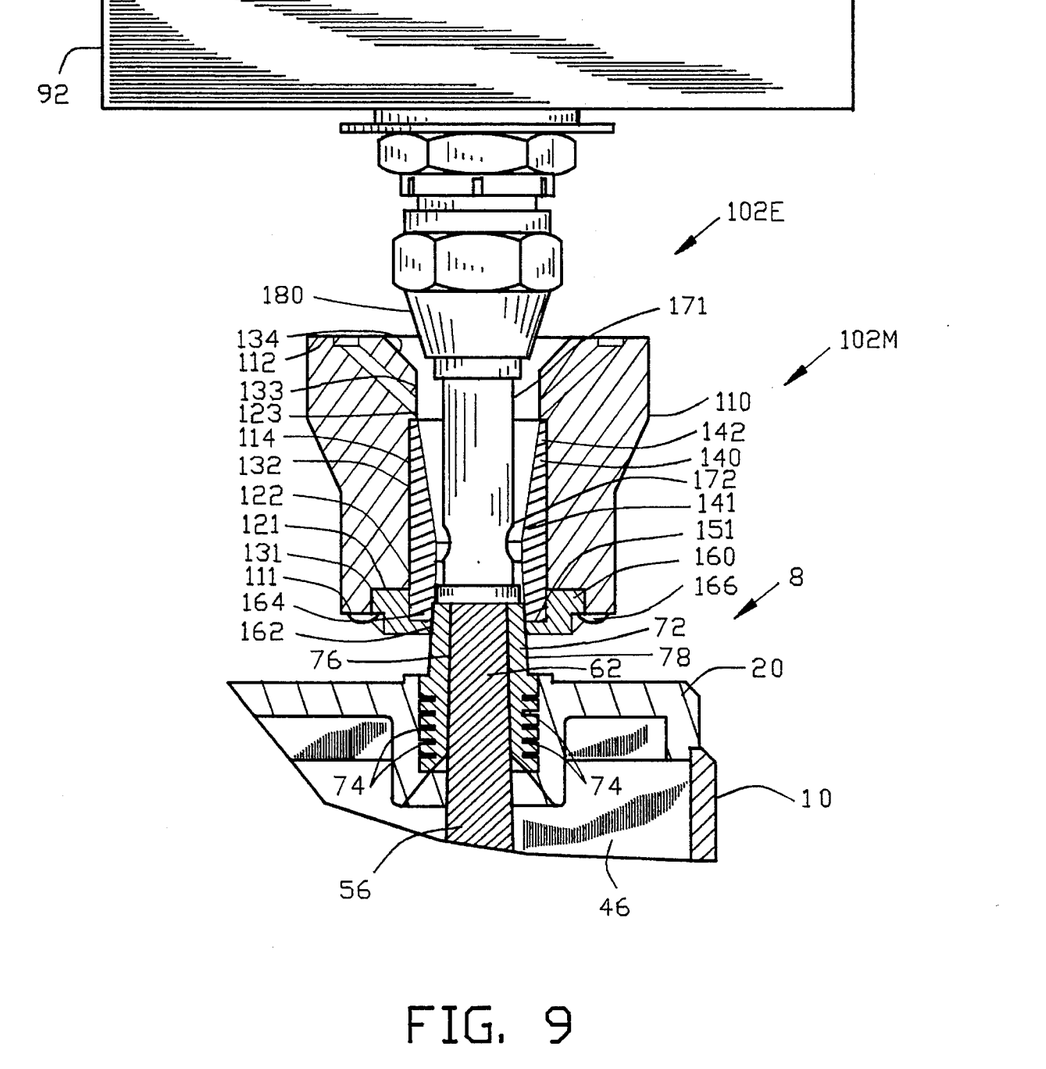
FIG. 9 is a sectional view similar to FIG. 7 with the resistive electrode welding the battery bushing to the battery post.

FIG. 9 is a sectional view similar to FIG. 7 with the resistive electrode 102E moved vertically downwardly for welding the substantial upper portion of the battery bushing 72 and the battery post 62. When the resistive electrode 102E is moved vertically downwardly into the position shown in FIG. 9, the material of the substantial upper portion of the battery bushing 72 and the battery post 62 are melted and fused for forming a weld to electrically connect the battery bushing 72 and the battery post 62.

Figure 10:
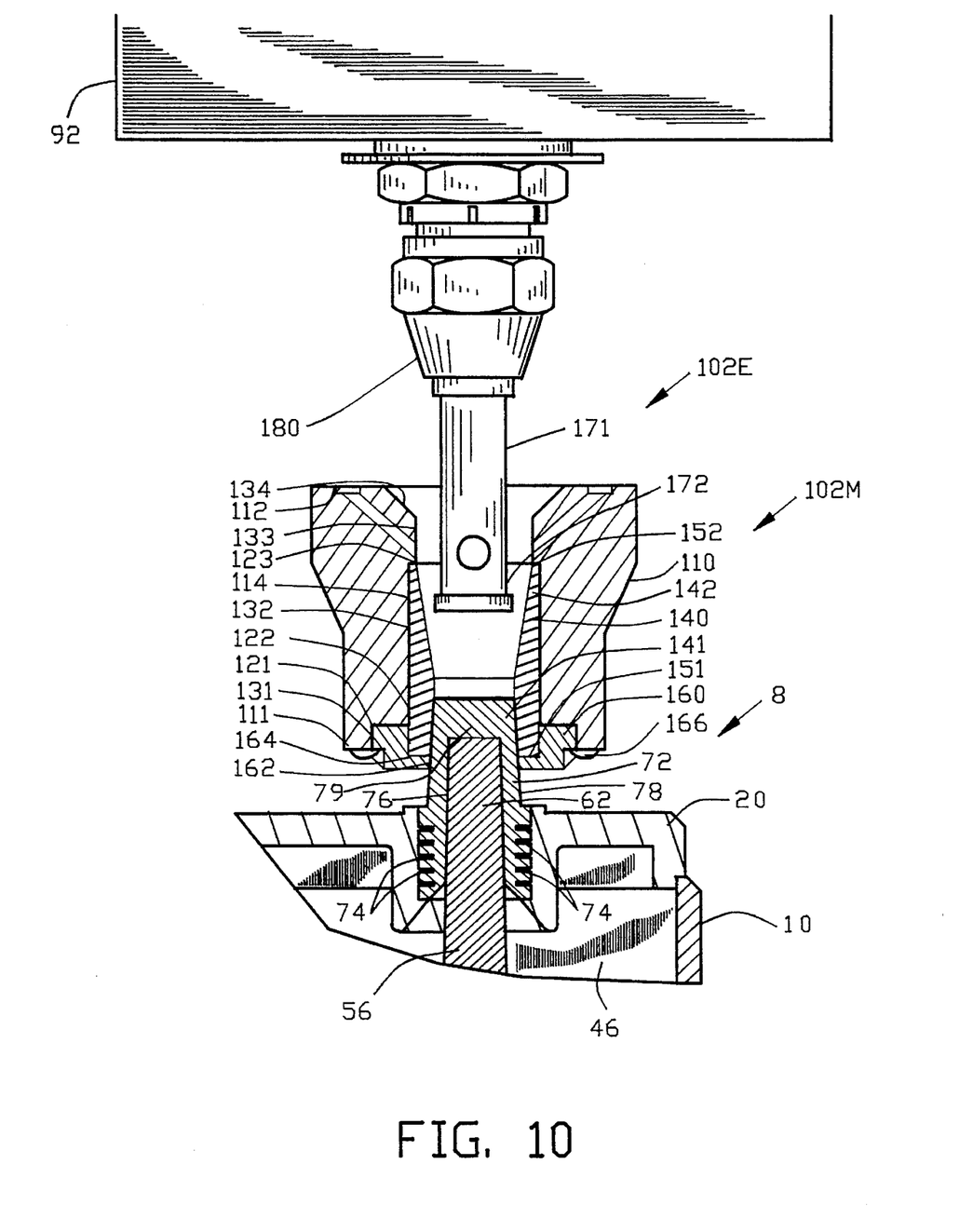
FIG. 10 is a sectional view similar to FIG. 7 with the resistive electrode positioned above the battery bushing and battery post after welding the battery bushing to the battery post.

FIG. 10 is a sectional view similar to FIG. 7 with the resistive electrode 102E positioned above the battery bushing 72 and battery post 62 after welding the battery bushing 72 to the battery post 62. After a vertically upward movement of the resistive electrode 102E from the position shown in FIG. 9, the molten lead of the battery bushing 72 and the battery post 62 fuses together and cools within the mold bushing 102M to form the battery bushing 72 into the desired finished cosmetic appearance.

The welding of the substantial upper portion of the battery bushing 72 and the battery post 62 provides a substantial and reliable weld between the battery bushing 72 and the battery post 62. The integrity and depth of the welding of the battery bushing 72 to the battery post 62 is insured since the resistive electrode 102E has penetrated to a desired depth from the vertically downward movement of the resistive electrode 102E.

Figure 11:
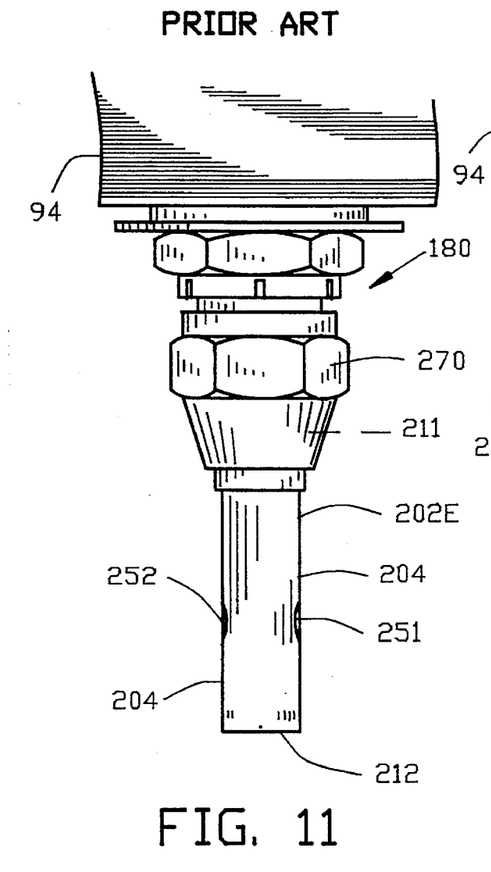
FIG. 11 is a side elevational view of the resistive electrode of the prior art.
Figure 12:
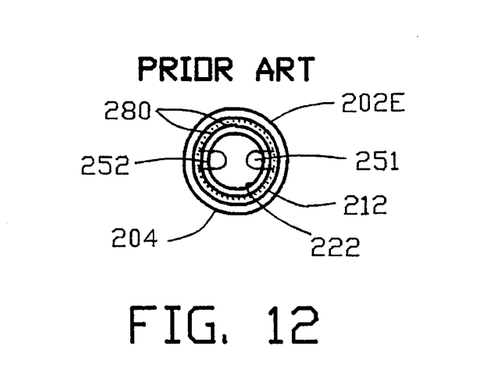
FIG. 12 is bottom view of FIG. 11.
Figure 13:
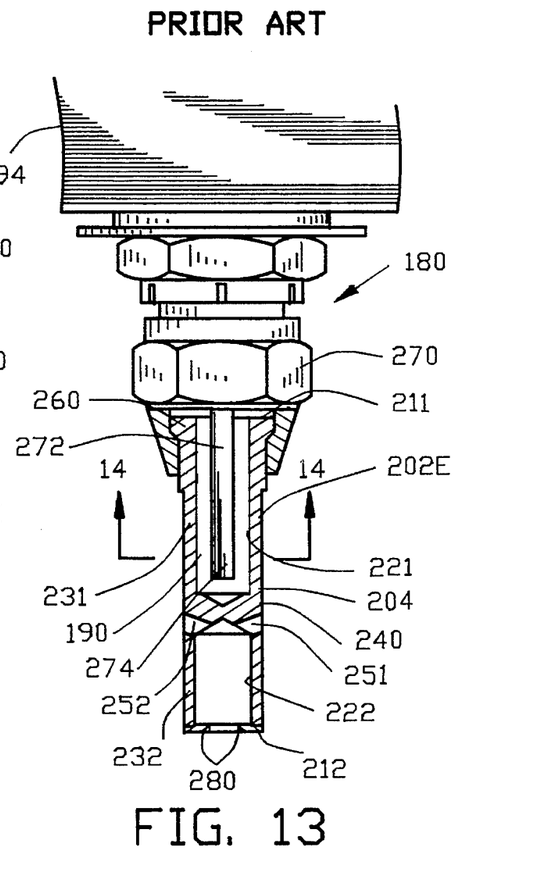
FIG. 13 is a sectional view of the prior art resistive electrode of FIG. 11.
Figure 14:
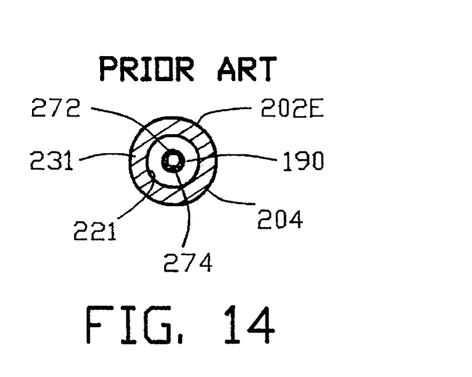
FIG. 14 is sectional view along line 14—14 in FIG. 13.

FIG. 11 is a side elevational view of the resistive electrode 202E of the prior art with FIG. 12 being a bottom view of FIG. 11. FIG. 13 is a sectional view of the prior art resistive electrode 202E of FIG. 11 with FIG. 14 being a sectional view along line 14—14 in FIG. 13. The prior art resistive electrode 202E has an outer substantially cylindrical surface 204 extending between a base end 211 and a tip end 212. A first bore 221 is defined in the base end 211 whereas a second bore 222 is defined in the tip end 212. The first and second bores 221 and 222 defined first and second sidewalls 231 and 232 of the prior art resistive electrode 202E. An intermediate wall 240 is interposed between the first and second bores 221 and 222. A first and a second gas aperture 251 and 252 extend from the outer substantially cylindrical surface 204 into the second bore 222. The first and second gas apertures 251 and 252 allow the release of gas generated from the welding process to escape from the second bore 222.

The base end 211 includes a flange 260 for cooperating with a compression nut 270 of the coupler 180 for electrically connecting the prior an resistive electrode 202E to the second connector of a power source (not shown). The coupler 180 includes a fluid coupling comprising an input fluid conduit 272 for introducing the cooling fluid 190 from a terminal orifice 274 into the first bore 221. The cooling fluid 190 absorbs heat from the defined sidewall 231 of the first bores 221 and is discharged from the first bore 221 into the coupler 180. The cooling fluid 190 cools the resistive electrode 202E in proximity to the first bore 221 the prior art resistive electrode 202E.

The tip end 212 of the prior an resistive electrode 202E is provided with projections 280 for facilitating the removal of any contaminants or oxides from the surface of the battery bushing 72. The projections 280 function in a manner similar to file or plane for removing contaminants or oxides from the surface of the battery bushing 72 upon rotation of the resistive electrode 202E.

Preferably, the prior art resistive electrode 202E is constructed of an electrically resistive metallic material such as titanium or stainless steel. The resistivity of the resistive electrode 202E provides the necessary heat to weld the battery bushing 72 to the battery post 62 upon the application of electrical power.

Although the prior art resistive electrode 202E shown in FIGS. 11–14 has made a major advance in the battery assembly art, a disadvantage of this prior art resistive electrode 202E was the useful life of the resistive electrode 202E. In addition, the prior art resistive electrode 202E did not properly concentrate the heat at the tip end 212 of the resistive electrode 202E.

Figure 15:
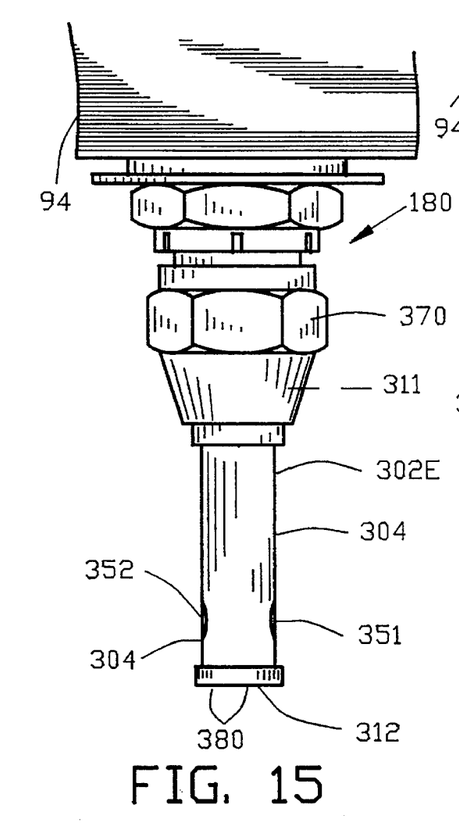
FIG. 15 is a side elevational view of a resistive electrode of the present invention.
Figure 16:
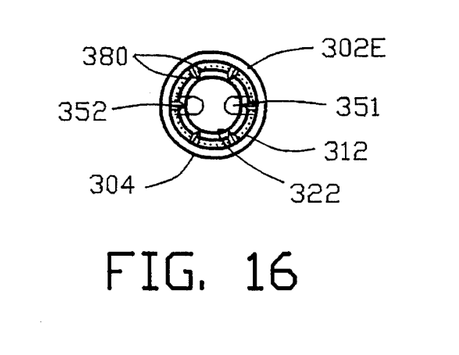
FIG. 16 is bottom view of FIG. 15.
Figure 17:
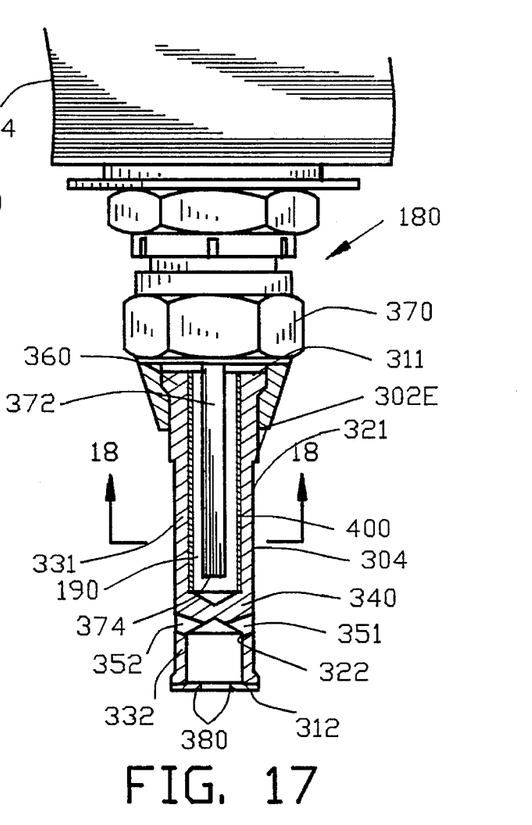
FIG. 17 is a sectional view of the resistive electrode of FIG. 15.

FIG. 15 is a side elevational view of the improved resistive electrode 302E of the present invention with FIG. 16 being bottom view of FIG. 15. FIG. 17 is a sectional view of the improved resistive electrode 302E of FIG. 15 with FIG. 18 being a sectional view along line 18—18 in FIG. 17. The improved resistive electrode 302E of the present invention has an outer substantially cylindrical surface 304 extending between a base end 311 and a tip end 312. The outer substantially cylindrical surface 304 of the improved resistive electrode 302E is decreased in diameter relative to the diameter of the outer substantially cylindrical surface 204 of the prior art resistive electrode 202E shown in FIGS. 11–14. The decrease in the outer substantially cylindrical surface 304 of the improved resistive electrode 302E reduces the transfer of heat from the improved resistive electrode 302E and the bushing mold 102M.

A first bore 321 is defined in the base end 311 whereas a second bore 322 is defined in the tip end 312. The first and second bores 321 and 322 defined a first and a second sidewall 331 and 332 of the improved resistive electrode 302E. An intermediate wall 340 is interposed between the first and second bores 321 and 322. A first and a second gas aperture 351 and 352 extend from the outer substantially cylindrical surface 304 into the second bore 322. The first and second gas apertures 351 and 352 allow the release of gas generated from the welding process to escape from the second bore 322.

The base end 311 includes a flange 360 for cooperating with a compression nut 370 of the coupler 180 for electrically connecting the improved resistive electrode 302E to the second connector of a power source (not shown). The coupler 180 includes a fluid coupling comprising an input fluid conduit 372 for introducing the cooling fluid 190 from a terminal orifice 374 into the first bore 321.

The tip end 312 of the improved resistive electrode 302E has a radially outwardly extending region for defining an enlarged annular tip surface. The enlarged annular tip surface is enlarged relative to the outer substantially cylindrical surface 304 of the improved resistive electrode 302E for providing a larger contact surface between the tip end 312 and the battery bushing 72. The larger contact surface between the tip end 312 and the battery bushing 72 increases the transfer of heat from the improved resistive electrode 302E to the battery bushing 72.

The tip end 312 of the improved resistive electrode 302E is provided with enlarged projections 380 for facilitating the removal of any contaminants or oxides from the surface of the battery bushing 72. The projections 380 function in a manner similar to file or plane for removing contaminants or oxides from the surface of the battery bushing 72 upon rotation of the improved resistive electrode 302E.

The first bore extends 321 into the improved resistive electrode 302E a first bore distance that is approximately seventy percent of the longitudinal distance between the base end 311 and the tip end 312 of the improved resistive electrode 302E. The second bore 322 extends into the improved resistive electrode 302E a second bore distance with the first bore distance at least four times greater than the second bore distance. As will become apparent hereinafter, the increased distance of the first bore 321 and the shortened distance of the second bore 322 relative to the prior art resistive electrode 202E shown in FIGS. 11–14 concentrates the resistive heat in proximity to the tip end 312 of the improved resistive electrode 302E.

Figure 18:
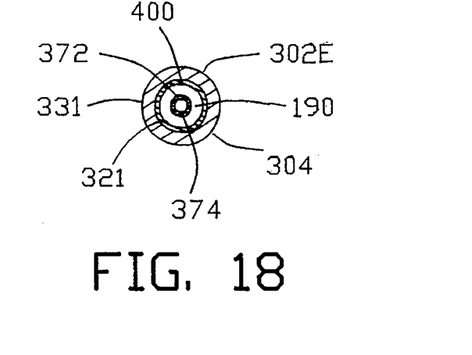
FIG. 18 is sectional view along line 18—18 in FIG. 17.

A conductive sleeve 400 is disposed in the first bore 321 for enhancing the flow of electrical current from the base end 311 to the tip end 312 of the improved resistive electrode 302E. Preferably, the conductive sleeve 400 is press fit into the first bore 311 for engaging the first sidewall 331. The conductive sleeve 400 has a sleeve thickness approximately forty percent of the thickness of the thickness of the first sidewall 331. The conductive sleeve 400 is integrally constructed of a material having a high electrical conductivity and a high thermal conductivity such as copper or the like.

The conductive sleeve 400 enhances the flow of electrical current from the base end 311 to the tip end 312 of the improved resistive electrode 302E for concentrating the resistive heat proximate to the tip end 312 of the improved resistive electrode 302E. In addition, the conductive sleeve 400 enhances the transfer of heat from the area of the first bore 321 of the improved resistive electrode 302E to the cooling fluid 190. The enhances the flow of electrical current from the base end 311 to the tip end 312 and the enhanced transfer of heat to the cooling fluid 190 concentrates the resistive heat proximate to the tip end 312 of the improved resistive electrode 302E.

Preferably, the improved resistive electrode 302E is fabricated from an electrically resistive material such as titanium or stainless steel or the like. The conductive sleeve 400 is fabricated from an electrically conductive material such as copper or the like. For example, silver is considered the standard in electrical conductivity having a valve of 100. Copper has an electrical conductivity of 97 whereas titanium has an electrical conductivity of 14. Preferably, the material of the conductive sleeve 400 has an electrical conductivity at least five times greater than the electrical conductivity of the material forming the improved resistive electrode 302E. In addition, the conductive sleeve 400 is fabricated from a thermally conductive material For example, copper has a thermal conductivity of 2688 BTUs, per square inch, per hour whereas titanium has a thermal conductivity of 111 BTU, per square inch, per hour. Preferably, the conductive sleeve 400 has a thermal conductivity at least twenty times greater than the thermal conductivity the material forming the improved resistive electrode 302E. It should be understood that many material may be used for the electrode material such as carbon, titanium, stainless steel, tantalum, molybdenum and the like.

The improved resistive electrode 302E of the present invention provides an increase in useful life over the resistive electrodes of the prior art. Typically, improved resistive electrode 302E of the present invention has a useful life of over six times the useful life of the resistive electrodes of the prior art.

The improved resistive electrode 302E has superior heat distribution characteristics over the resistive electrodes of the prior art. The improved resistive electrode 302E demonstrates enhanced resistive heating proximate to the tip end 312 relative to the resistive electrodes of the prior art. The enlarged annular tip surface provides a larger contact surface between the tip end 312 and the battery bushing 72 to increase the transfer of heat from the improved resistive electrode 302E to the battery bushing 72.

The improved resistive electrode 302E has superior cooling characteristics relative to the resistive electrodes of the prior art. The improved resistive electrode 302E enhances the transfer of heat from the area of the first bore 321 of the improved resistive electrode 302E to the cooling fluid 190. The improved cooling characteristics prolongs the operative life of the improved resistive electrode 302E.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In a welding apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the welding apparatus comprising a bushing mold for location on the battery bushing for connecting the bushing to a first connector of a power source and a resistive electrode connected to a second connector of the power source;

the resistive electrode extending longitudinally between a base end and a tip end with the base end being secured to the second connector of the power source, a first bore being defined in the base end for receiving a cooling fluid for cooling the resistive electrode, a second bore being defined in the tip end for providing an annular tip surface for engaging with the battery bushing to enable the flow of electric power between the resistive electrode and the mold bushing to heat the resistive electrode for welding the battery terminal post to the battery bushing, the improvement comprising:

a conductive sleeve disposed in the first bore said conductive sleeve enhancing the flow of electrical current from the base end to the tip end of the resistive electrode and concentrating the resistive heat proximate to the tip end of the resistive electrode; and said conductive sleeve facilitating the transfer of heat from the resistive electrode to the cooling fluid.

2. An improvement as set forth in claim 1, wherein the first bore defines a first bore sidewall; and said conductive sleeve engaging the first bore sidewall for facilitating the flow of heat therebetween.

3. An improvement as set forth in claim 1, wherein the first bore defines a first bore sidewall having a first sidewall thickness; and said conductive sleeve having a sleeve thickness approximately forty percent of the thickness of said first sidewall thickness.

4. An improvement as set forth in claim 1, wherein the first bore extends into the resistive electrode a first bore distance; and said first bore distance being approximately seventy percent of the longitudinal distance between the base end and the tip end of the resistive electrode.

5. An improvement as set forth in claim 1, wherein the first bore extends into the resistive electrode a first bore distance; and the second bore extending into the resistive electrode a second bore distance with the first bore distance at least four times greater than said second bore distance for concentrating the resistive heat in proximity to the tip end of the resistive electrode.

6. An improvement as set forth in claim 1, wherein said conductive sleeve is formed from a sleeve material having an electrical conductivity at least five times greater than the electrical conductivity the electrode material forming the resistive electrode.

7. An improvement as set forth in claim 1, wherein said conductive sleeve is formed from a sleeve material having a thermal conductivity at least twenty times greater than the thermal conductivity the electrode material forming the resistive electrode.

8. An improvement as set forth in claim 1, wherein said tip end includes a radially outwardly extending region for defining an enlarged annular tip surface for engaging with the battery bushing to enable the flow of electric power between the resistive electrode and the mold bushing to heat the resistive electrode for welding the battery terminal post to the battery bushing.

9. An improvement as set forth in claim 1, wherein the resistive electrode is formed from titanium material and the conductive sleeve is formed from a copper material.

10. An improvement as set forth in claim 1, wherein the resistive electrode is formed from stainless steel material and the conductive sleeve is formed from a copper material.

11. In a welding apparatus for welding a battery terminal post to a battery bushing, the battery terminal post being electrically connected to a battery plate disposed within a battery case and the battery bushing being secured to a battery case cover with the bushing having a central bushing aperture for receiving the battery terminal post therein when the battery case cover is located on the battery case, the welding apparatus comprising a bushing mold for location on the battery bushing for connecting the bushing to a first connector of a power source and a resistive electrode connected to a second connector of the power source;

the resistive electrode being generally cylindrical and extending longitudinally between a base end and a tip end with the base end being secured to the second connector of the power source, a first bore being defined in the base end for receiving a cooling fluid for cooling the resistive electrode, a second bore being defined in the tip end for providing an annular tip surface for engaging with the battery bushing to enable the flow of electric power between the resistive electrode and the mold bushing to heat the resistive electrode for welding the battery terminal post to the battery bushing, the improvement comprising:

the first bore distance extending approximately seventy percent of the longitudinal distance between the base end and the tip end of the resistive electrode;

a copper conductive sleeve disposed in the first bore and engaging a sidewall of the first bore, said copper conductive sleeve enhancing the flow of electrical current from the base end to the tip end of the resistive electrode and concentrating the resistive heat proximate to the tip end of the resistive electrode; and said conductive sleeve facilitating the transfer of heat from the resistive electrode to the cooling fluid.

12. An improvement as set forth in claim 11, wherein the first bore defines a first bore sidewall having a first sidewall thickness; and said conductive sleeve having a sleeve thickness approximately forty percent of the thickness of said first sidewall thickness.

13. An improvement as set forth in claim 11, wherein the first bore extends into the resistive electrode a first bore distance; and said first bore distance being approximately seventy percent of the longitudinal distance between the base end and the tip end of the resistive electrode.

14. An improvement as set forth in claim 11, wherein the first bore extends into the resistive electrode a first bore distance; and the second bore extending into the resistive electrode a second bore distance with the first bore distance at least 1.5 times greater than said second bore distance for concentrating the resistive heat in proximity to the tip end of the resistive electrode.

15. An improvement as set forth in claim 11, wherein said conductive sleeve is formed from a sleeve material having an electrical conductivity at least five times greater than the electrical conductivity the electrode material forming the resistive electrode.

16. An improvement as set forth in claim 11, wherein said conductive sleeve is formed from a sleeve material having a thermal conductivity at least twenty times greater than the thermal conductivity the electrode material forming the resistive electrode.

17. An improvement as set forth in claim 11, wherein said tip end includes a radially outwardly extending region defining an enlarged annular tip surface for engaging with the battery bushing to enable the flow of electric power between the resistive electrode and the mold bushing to heat the resistive electrode for welding the battery terminal post to the battery bushing.

18. An improvement as set forth in claim 11, wherein the resistive electrode is formed from titanium material.

19. An improvement as set forth in claim 11, wherein the resistive electrode is formed from stainless steel material.

* * * * *